(12) United States Patent
Kaufhold et al.

(10) Patent No.: US 6,518,389 B1
(45) Date of Patent: Feb. 11, 2003

(54) ALIPHATIC THERMOPLASTIC POLYURETHANES, PROCESSES FOR THEIR PREPARATION AND THEIR USE

(75) Inventors: Wolfgang Kaufhold, Köln (DE); Hans-Georg Hoppe, Leichlingen (DE); Herbert Heidingsfeld, Frechen (DE); Bernhard Schulte, Krefeld (DE); Henricus Peerlings, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/459,527

(22) Filed: Dec. 13, 1999

(30) Foreign Application Priority Data

Dec. 16, 1998 (DE) .......................... 198 57 964
Apr. 30, 1999 (DE) .......................... 199 19 788
Aug. 24, 1999 (DE) .......................... 199 40 014

(51) Int. Cl.$^7$ .............................. C08G 18/10
(52) U.S. Cl. ................. 528/59; 528/80; 528/83
(58) Field of Search .................... 528/59, 80, 83

(56) References Cited

U.S. PATENT DOCUMENTS

| | | | | |
|---|---|---|---|---|
| 3,620,905 A | | 11/1971 | Ahramjian ................. 161/190 |
| 4,621,113 A | * | 11/1986 | Collins .................... 524/196 |
| 4,656,228 A | | 4/1987 | Richter et al. ............. 525/433 |
| 4,951,657 A | * | 8/1990 | Pfister et al. .............. 128/156 |
| 5,541,227 A | | 7/1996 | Muhlfeld et al. ............ 528/28 |
| 5,824,738 A | | 10/1998 | Humphrey et al. ......... 524/715 |
| 5,905,133 A | * | 5/1999 | Muller et al. ............... 528/61 |

FOREIGN PATENT DOCUMENTS

| | | |
|---|---|---|
| DE | 2901774 | 7/1980 |
| DE | 196 30 817 | 2/1998 |
| EP | 414060 | 8/1990 |
| EP | 712887 | 9/1995 |
| GB | 1473588 | 5/1977 |
| JP | 6-116355 | 4/1994 |

OTHER PUBLICATIONS

Chem.–Ing.–Tech. 52 (month unavailable), 1980, Nr. 4, pp. 285–291, Pahl et al, "Statische Mischer und ihre Anwendung".

Justus Liebigs Annalen Der Chemie, Dec. 11, 1948, vol. 562, pp. 6, 76–136, Von Werner Sielfkin, "Mono– und Polyisocyanaate".

Patent Abstracts of Japan, vol. 1998, No. 9, Jul. 31, 1998 & JP 10 110025 A (Dainippon Ink &Amp; Chem Inc), Apr. 28, 1998 *Zusammenfassung.

* cited by examiner

*Primary Examiner*—James J. Seidleck
*Assistant Examiner*—Melanie Bissett
(74) *Attorney, Agent, or Firm*—Joseph C. Gil; Aron Preis; John E. Mrozinski, Jr.

(57) ABSTRACT

A thermoplastic composition comprising aliphatic polyurethane is disclosed. The composition is charactrized in having a post weathering yellow value lower than 20 and good hardness and softening temperature values both before and after weatering for 504 hours in accordance with ISO 4892.

6 Claims, No Drawings

ALIPHATIC THERMOPLASTIC POLYURETHANES, PROCESSES FOR THEIR PREPARATION AND THEIR USE

The invention relates to aliphatic thermoplastic polyurethanes (TPUs) with improved properties, processes for their preparation and their use.

Aromatic thermoplastic polyurethanes (aromatic TPUs) are not stable to light because they are built up from aromatic diisocyanates. In colour formulations of shaped articles, severe yellowing develops due to the action of light, and a change in colour and degree of gloss occurs even in black shaped articles.

DE-C 42 03 307 describes a polyurethane moulding composition which can be processed thermoplastically in the form of sintered powder for the production of grained sintered films, the powder being prepared exclusively from linear, aliphatic components. The polyol component is composed of 60 to 80 parts by weight of an aliphatic polycarbonate diol having a molecular weight $\overline{M}_n$ of 2,000 and 40 to 20 parts by weight of a polydiol based on adipic acid, hexanediol and neopentylglycol having a molecular weight $\overline{M}_n$ of 2,000. 1,6-Hexamethylene-diisocyanate in an equivalent ratio of 2.8:1.0 to 4.2:1.0, based on the polyol mixture, and 1,4-butanediol as a chain-lengthening agent are employed, the equivalent ratio of the 1,4-butanediol, based on the polyol mixture, being 1.3:1.0 to 3.3:1.0. This moulding composition has the disadvantage that after storage (at room temperature and especially in an accelerated ageing test, such as the changing climate test, Arizona test and in heat (60–95° C.)) it tends towards a formation of a white deposit. This is a disadvantage in particular for applications with optical demands.

U.S. Pat. No. 5,824,738 describes a light-stable, aliphatic TPU which is distinguished by a very low yellowing even after intensive simulated weathering. The light-stable TPU described comprises on the one hand a critical combination of UV stabilizer, antioxidant and pigment, and on the other hand a polyether polyol based on propylene oxide with ethylene oxide end groups, dicyclohexylmethane-diisocyanate (hydrogenated MDI=$H_{12}$-MDI) and 1,4-butanediol. Although these TPUs based on $H_{12}$-MDI are stable to light, they have the disadvantage that they have only a relatively low heat stability, which is a particular disadvantage for applications e.g. inside automobiles, where a high heat resistance is required.

The object of the present invention was therefore to provide both light- and heat-stable thermoplastic polyurethanes and a process for their preparation. For high optical requirements, such as e.g. inside automobiles, there was additionally the object of providing TPUs which, after storage at room temperature and in particular after the accelerated ageing test (e.g. after storage at 60 to 95° C.), still give shaped articles which show only a slight or no formation of a deposit.

It has been possible to achieve this object with the thermoplastic polyurethanes according to the invention.

The present invention relates to aliphatic thermoplastic polyurethanes characterized in having a yellow value after having been subjected to weathering, lower than 20, preferably lower than 15, selected from the group consisting of
(i) polyurethanes having Shore A hardness of 75 to 84 and a Softening Temperature greater than 100° C., and
(ii) polyurethanes having Shore A hardness of 85 to 98 and Softening Temperature greater than 130° C.

The yellow value being determined after weathering for 504 hours in accordance with ISO 4892; the Softening Temperature, at E'=3 Mpa, determined by means of dynamic-mechanical analysis in the tensile mode, as described in more details below and the hardness values refer to measurements both before and after weaterhing for 504 hours in accordance with ISO 4892.

The aliphatic thermoplastic polyurethanes according to the invention are obtainable from A) 100 to 60 mol %, preferably 100 to 70 mol %, particularly preferably 100 to 80 mol % hexamethylene-diisocyanate (HDI) based on the total amount of diisocyanates and 0 to 40 mol %, preferably 0 to 30 mol %, particularly preferably 0 to 20 mol % of other aliphatic diisocyanates based on the total amount of diisocyanates B) polyester polyol having a number average molecular weight of between 600 and 5,000 g/mol, preferably 700 and 4,200 g/mol C) chain lengthener having a number average molecular weight of 60 to 500 g/mol D) UV stabilizers in an amount of 0.4 to 0.9 wt. %, preferably 0.4 to 0.8 wt. %, based on A)+B)+C)

E) optionally catalysts and

F) optionally further conventional auxiliary substances and additives, wherein the equivalent ratio of diisocyanate A) to polyol B) is between 1.5:1.0 and 10.0:1.0, and wherein the NCO index (obtained from the quotient of the equivalent ratios of isocyanate groups and the sum of hydroxyl groups from the polyol and chain-lengthening agent multiplied by 100) is 95 to 105.

The TPUs according to the invention can be produced by various types of processes which are however all equally effective.

The TPUs according to the invention based on two different aliphatic diisocyanates "A1" (HDI) and "A2" (aliphatic diisocyanate), can for example (cf. also pages 10 to 14 of the present description) be produced to form an "A1/2" TPU in one reaction process. It is however also possible first of all to produce an "A1" TPU based on aliphatic diisocyanate "A1" and to produce an "A2" TPU based on aliphatic diisocyanate "A2" separately, the other components B to F being identical. Then the "A1" TPU and the "A2" TPU are mixed (e.g. in extruders or kneaders) in a known manner in the required ratio to form the "A1/2" TPU.

The TPUs based on mixtures of polyols according to the invention can also be produced in one reaction process (see also pages 10 to 14) to form a "B1/2" TPU by using mixtures of polyols (a B1 polyol and a B2 polyol) (e.g. mixed aggregates). It is also possible first of all to produce a "B1" TPU based on polyol "B1" in a known manner and then to produce a "B2" TPU based o polyol "B2" separately, the remaining components A and C to F being identical. Then the "B1" and "B2" TPUs are mixed e.g. in extruders or kneaders) in a known manner in the required ratio to form the "B1/2" TPU.

Instead of the polyester polyol B), the following polyols can be employed:

polyether polyol having a number average molecular weight of between 600 and 5,000 g/mol, preferably between 700 and 4,200 g/mol, polycarbonate diol having a number average molecular weight of between 600 and 5,000 g/mol, preferably between 700 and 4,200 g/mol, polyether polyol/polyester polyol mixture having a number average molecular weight of between 600 and 5,000 g/mol, preferably between 700 and 4,200 g/mol, polyether polyol/polycarbonate diol mixture having a number average molecular weight of between 600 and 5,000 g/mol, preferably between 700 and 4,200 g/mol, polyester polyol/polycarbonate diol mixture having a number average molecular weight of between 600 and 5,000 g/mol, preferably between 700 and 4,200 g/mol.

A mixture of 20 to 80 parts by wt. of an aliphatic polycarbonate diol having a number average molecular weight of 1,000 to 2,200 g/mol and 80 to 20 parts by wt. of a polybutanediol adipate or a polycaprolactone diol having a number average molecular weight of 1,000 to 2,400 g/mol is preferably employed as the polyol component.

The polyol component particularly preferably comprises a mixture of 30 to 70 parts by wt. of an aliphatic polycarbonate diol having a number average molecular weight of 1,000 to 2,200 g/mol and 70 to 30 parts by wt. of a polybutanediol adipate or a polycaprolactone diol having a number average molecular weight of 1,000 to 2,400 g/mol.

If the content of polybutanediol adipate in the polyol mixture is increased above 50% and there are particular requirements regarding hydrolysis, known hydrolysis stabilizers (such as e.g. carbodiimides) must be added to the polybutanediol adipate.

Suitable UV stabilizers are described in R. Gächter, H. Müller (ED.): Taschenbuch der Kunststoff-Additive [Pocket Book of Plastics Additives], $3^{rd}$ edition, Hanser Verlag, Munich 1989, chapter "Polyurethanes".

A mixture of hindered amine stabilizers (HALS) and hydroxyphenylbenzotriazoles in a weight ratio of 2:1 to 1:2 is particularly preferably employed as the UV stabilizers.

Depending on the requirements on the moulding which is produced from the TPU according to the invention, some of the hexamethylene-diisocyanate (HDI) can be replaced by one or more other aliphatic diisocyanates, in particular isophorone-diisocyanate (IPDI), 1,4-cyclohexane-diisocyanate, 1-methyl-2,4-cyclohexane-diiso-cyanate, 1-methyl-2,6-cyclohexane-diisocyanate and isomer mixtures thereof, and 4,4'-, 2,4'- and 2,2'-dicyclohexylmethane-diisocyanate and isomer mixtures thereof.

Thermoplastic polyurethanes according to the invention which are particularly preferred are those which are obtainable from A) 95 to 70 mol % hexamethylene-diisocyanate and 5 to 30 mol % of other aliphatic diisocyanates, B) polyester polyol, polyether polyol, polycarbonate diol, a mixture of polyether polyol and polyester polyol, a mixture of polyether polyol and polycarbonate diol or a mixture of polyester polyol and polycarbonate diol, in each case having a number average molecular weight of between 600 and 5,000 g/mol, preferably 700 and 4,200 g/mol, C) chain lengthener having a number average molecular weight of 60 to 500 g/mol, D) UV stabilizers in an amount of 0.4 to 0.9 wt. %, preferably 0.4 to 0.8 wt. %, based on A)+B)+C), E) optionally catalysts and F) optionally conventional auxiliary substances and additives, wherein the equivalent ratio of diisocyanate A) to polyol B) is between 1.5:1.0 and 10.0:1.0 and wherein the NCO index (obtained from the quotient of the equivalent ratios of isocyanate groups and the sum of the hydroxyl groups from the polyol and chain-lengthening agent multiplied by 100) is 95 to 105 and where in a test specimen produced from the thermoplastic polyurethane shows only a slight formation of a deposit (chalking) on the surface after 3 weeks storage at 60 to 95° C.

Thermoplastic polyurethanes according to the invention which are also preferred are those obtainable from A) 100 to 60 mol %, preferably 100 to 70 mol %, particularly preferably 100 to 80 mol % hexamethylene-diisocyanate (HDI) and 0 to 40 mol %, preferably 0 to 30 mol %, particularly preferably 0 to 20 mol % of other aliphatic diisocyanates, B) polyester polyol, polyether polyol, polycarbonate diol, a mixture of polyether polyol and polyester polyol, a mixture of polyether polyol and polycarbonate diol or a mixture of polyester polyol and polycarbonate diol, in each case having a number average molecular weight of between 600 and 5,000 g/mol, C) 80 to 100 wt. % 1,6-hexanediol and 0 to 20 wt. % chain lengthener having a number average molecular weight of 60 to 500 g/mol, D) UV stabilizers in an amount of 0.4 to 0.9 wt. %, preferably 0.4 to 0.8 wt. %, based on A)+B)+C), E) optionally catalysts and F) optionally conventional auxiliary substances and additives, wherein the equivalent ratio of diisocyanate A) to polyol B) is between 1.5:1.0 and 10.0:1.0 and wherein the NCO index (obtained from the quotient of the equivalent ratios of isocyanate groups and the total of the hydroxyl groups from the polyol and chain-lengthening agent multiplied by 100) is 95 to 105 and wherein a test specimen produced from the thermoplastic polyurethane shows only a slight formation of deposit (chalking) on the surface after 3 weeks storage at 60 to 95° C.

For applications with lower light stability requirements, i.e. dark-coloured moulding compositions, 0 to 20 wt. % of the aliphatic diisocyanate can be replaced by aromatic diisocyanates. These are described in Justus Liebigs Annalen der Chemie 562, p. 75–136. Examples are 2,4-toluylene-diisocyanate, mixtures of 2,4- and 2,6-toluylene-diisocyanate, 4,4'-, 2,2'- and 2,4'-diphenylmethane-diisocyanate, mixtures of 2,4- and 4,4'-diphenylmethane-diisocyanate, urethane-modified liquid 2,4- and/or 4,4'-diphenylmethane-diisocyanate, 4,4'-diisocyanato-1,2-diphenylethane and 1,5-naphthylene-diisocyanate.

Linear polyols having hydroxyl end groups and a number average molecular weight of 600 to 5,000 g/mol, preferably 700 to 4,200 g/mol, are employed as component B). These often comprise small amounts of non-linear compounds due to the production. "Substantially linear polyols" are therefore also often referred to.

Suitable polyester diols can be prepared, for example, from dicarboxylic acids having 2 to 12 carbon atoms, preferably 4 to 6 carbon atoms, and polyhydric alcohols. Possible dicarboxylic acids are, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. To prepare the polyester diols, it may optionally be advantageous to use the corresponding dicarboxylic acid derivatives, such as carboxylic acid diesters having 1 to 4 carbon atoms in the alcohol radical, carboxylic acid anhydrides or carboxylic acid chlorides, instead of the dicarboxylic acids. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols can be used by themselves or optionally in a mixture with one another, depending on the desired properties. Compounds which are furthermore suitable are esters of carbonic acid with the diols mentioned, in particular those having 4 to 6 carbon atoms, such as 1,4-butanediol or 1,6-hexanediol, condensation products of hydroxycarboxylic acids, for example hydroxycaproic acid, and polymerization products of lactones, for example optionally substituted caprolactones. Polyester diols which are preferably used are ethanediol polyadipates, 1,4-butanediol polyadipates, ethanediol-1,4-butanediol polyadipates, 1,6-hexanediol-neopentyl-glycol polyadipates, 1,6-hexanediol-1,4-butanediol polyadipates and poly-capro-lactones. The polyester diols have average molecular weights of 600 to 5,000, preferably 700 to 4,200, and can be used individually or in the form of mixtures with one another.

Suitable polyether diols can be prepared by reacting one or more alkylene oxides having 2 to 4 carbon atoms in the alkylene radical with a starter molecule which contains two active bonded hydrogen atoms. Alkylene oxides which may be mentioned are e.g.: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably employed. The alkylene oxides can be used individually, alternately in succession or as mixtures. Possible starter molecules are, for example: water, amino alcohols, such as N-alkyl-diethanolamines, for example N-methyl-diethanolamine, and diols, such as ethylene glycol, 1,3-propylene glycol, 1,4-butanediol and 1,6-hexanediol. Mixtures of starter molecules can optionally also be employed. Suitable polyether diols are furthermore the polymerization products of tetrahydrofuran which contain hydroxyl groups. Trifunctional polyethers can also be employed in amounts of 0 to 30 wt. %, based on the bifunctional polyethers, but at most in an amount such that a thermoplastically processable product is formed. The substantially linear polyether diols have a number average molecular weight (Mn) of 600 to 5,000, preferably 700 to 4,200. They can be used both individually and in the form of mixtures with one another.

Hydroxyl-group-containing polymerization products of tetrahydrofuran and polyether diols based on ethylene oxide and/or propylene oxide are particularly preferred. Even only the partial use of these preferred polyether diols in polyol mixtures, in particular with 1,6-hexanediol as a chain-lengthening agent, produces TPUs on the surface of which only very slight deposits are formed after accelerated ageing tests (e.g. after storage at 60 to 95° C).

Chain-lengthening agents C) which are employed are aliphatic diols or mixtures of aliphatic diols and diamines having a molecular weight of 60 to 500, preferably aliphatic diols having 2 to 14 carbon atoms, such as e.g. ethanediol, 1,6-hexanediol, diethylene glycol, dipropylene glycol and, in particular, 1,4-butanediol, or (cyclo)aliphatic diamines, such as e.g. isophoronediamine, ethylenediamine, 1,2-propylenediamine, 1,3-propylenediamine, N-methyl-propylene-1,3-diamine and N,N'-dimethylethylenediamine. Mixtures of the abovementioned chain lengtheners can also be employed. In addition, smaller amounts of triols can also be added, but at most in an amount such that a thermoplastically processable product is formed.

1,6-Hexanediol is particularly preferred as the chain-lengthening agent, optionally mixed with up to 20 wt. % of chain lengthener having a number average molecular weight of 60 to 500 g/mol, since TPUs prepared with 1,6-hexanediol and test specimens obtained therefrom show only a slight formation of a deposit on the surface after accelerated ageing tests (e.g. after storage at 60 to 95° C.).

For applications with lower light stability requirements, e.g. for dark-coloured moulding compositions, 0–80wt. % of the aliphatic diols and 0–20 wt. % of the diamines can be replaced by aromatic diols and diamines. Examples of suitable aromatic diols are diesters of terephthalic acid with glycols having 2 to 4 carbon atoms, such as e.g. terephthalic acid bis-ethylene glycol or terephthalic acid bis-1,4-butanediol, hydroxyalkylene ethers of hydroquinone, such as e.g. 1,4-di(hydroxyethyl)-hydroquinone, and ethoxylated bisphenols. Examples of suitable aromatic diamines are 2,4-toluylene-diamine and 2,6-toluylenediamine, 3,5-diethyl-2,4-toluylenediamine and 3,5-diethyl-2,6-toluylenediamine and primary mono-, di-, tri- or tetraalkyl-substituted 4,4'-diaminodiphenylmethanes.

Conventional monofunctional compounds can furthermore be employed in small amounts, e.g. as chain stoppers or mould release aids. Examples which may be mentioned are alcohols, such as octanol and stearyl alcohol, or amines, such as butylamine and stearylamine.

The invention also provides a process for the continuous preparation of the thermoplastic polyurethanes according to the invention, which is characterized in that the polyol/the polyol mixture B) and the chain lengthener C) are mixed continuously and thereafter the mixture is mixed intensively with the diisocyanate/-diisocyanate mixture A) (one-shot process), and the reaction is subsequently brought to completion in a discharge vessel (e.g. in an extruder) and the product thus obtained is optionally granulated.

The reaction is preferably carried out in the presence of a catalyst.

The mixture of polyol (B) and chain lengthener (C) is preferably mixed homogeneously with the diisocyanate (A) in a reactor within a period of not more than 5 seconds. The thorough mixing should preferably take place with a low degree of back-mixing. A low degree of back-mixing in the context of this invention means that the residence time properties in the reactor correspond to a series of ≧10 ideal stirred tanks (cascade of stirred tanks). Homogeneous thorough mixing in the context of the invention means that the concentration distribution of components (A) and (B)+(C) and of the reaction product in the mixture has a relative standard deviation of less than 5%.

Before components (A) and (B)+(C) are introduced continuously into the reactor, they must be heated separately from one another, preferably in a heat exchanger, to a temperature of between 60 and 150° C., preferably between 80 and 120° C. It is essential according to the invention that the temperatures of components (A) and (B)+(C) differ by less than 20° C. before they are brought together in the reactor. The temperature difference between component streams (A) and (B)+(C) should preferably be <10° C., particularly preferably <5° C.

The mixture thus obtained is then reacted in any desired reactor, preferably an extruder or a reaction tube, to give the TPU.

According to the invention, the polyaddition is preferably carried out in an isolated and preferably heatable static mixer. This has the advantage that it has no movable parts and that a homogeneous thorough mixing virtually without back-mixing takes place within a very short time. Static mixers which can be employed according to the invention are described in Chem.-Ing. Techn. 52, no. 4 on pages 285–291 and in "Mischen von Kunststoff und Kautschukprodukten [Mixing of Plastics and Rubber Products]", VDI-Verlag, Düsseldorf 1993.

Static mixers according to DE-C 23 28 795 are preferably employed. The static mixers preferably have a length/diameter ratio of 8:1 to 16:1, particularly preferably 10:1 to 14:1. A residence time in the static mixer of <5 seconds, preferably <2.5 seconds results. The static mixers are preferably made of high-grade steel, particularly preferably of V4A.

The invention also provides a process for the continuous preparation of the thermoplastic polyurethanes according to the invention, which is characterized in that the polyol/polyol mixture B) and the chain lengthener C) are mixed continuously, the mixture is then reacted completely with the hexamethylene-diisocyanate, the mixture is then mixed and reacted with the optional aliphatic diisocyanate, the reaction is brought to completion in a discharge vessel and the product is optionally granulated. This process variant is particularly preferred.

The process can also be carried out by a procedure in which the mixture is reacted with the optional aliphatic diisocyanate, the mixture is then mixed and reacted with hexamethylene-diisocyanate, the reaction is brought to completion in a discharge vessel and the product is optionally finally granulated.

The thermoplastic polyurethanes according to the invention can also be prepared by the prepolymer process, in which the diisocyanate/diisocyanate mixture is first mixed with the polyol/polyol mixture and the mixture is reacted to give a prepolymer, and this prepolymer is mixed and reacted with the chain lengthener in a second step.

A catalyst is preferably employed in the continuous preparation of the thermoplastic polyurethanes by the extruder or belt process. Suitable catalysts are known from the prior art and are conventional tertiary amines, such as e.g. triethylamine, dimeth-yl-cyclohexylamine, N-methylmorpholine, N,N'-dimethyl-piperazine, 2-(dimethylaminoethoxy)-ethanol, diazabicyclo-[2.2.2]-octane and the like and, in particular, organometallic compounds, such as titanic acid esters, iron compounds and tin compounds, e.g. tin diacetate, tin dioctoate, tin dilaurate or the dialkyltin salts of aliphatic carboxylic acids, such as dibutyltin diacetate, dibutyltin dilaurate or the like. Preferred catalysts are organometallic compounds, in particular titanic acid esters or iron or tin compounds. Dibutyltin dilaurate is especially preferred.

In addition to the TPU components, UV stabilizers and optionally catalysts, auxiliary substances and additives can also be added. Examples which may be mentioned are lubricants, such as fatty acid esters, their metal soaps, fatty acid amides and silicone compounds, antiblocking agents, inhibitors, stabilizers against hydrolysis, heat and discoloration, flameproofing agents, dyestuffs, pigments and inorganic and organic fillers and reinforcing agents, which are prepared according to the prior art and can also be sized. Further details on the auxiliary substances and additives mentioned can be found in the technical literature, for example J. H. Saunders, K. C. Frisch: "High Polymers", volume XVI, Polyurethane [Polyurethanes], part 1 and 2, Interscience Publishers 1962 or 1964, R. Gächter, H. Müller (Ed.): Taschenbuch der Kunststoff-Additive [Pocket Book of Plastics Additives], 3rd edition, Hanser Verlag, Munich 1989 or DE-A-29 01 774.

The lubricants are preferably added in amounts of 0.1 to 1.0 wt. %, based on A)+B)+C). The antioxidants are preferably used in amounts of 0.1 to 0.7 wt. %, based on A) and B) and C).

The TPU according to the invention is preferably prepared continuously, the polyol/polyol mixture and the chain lengthener being mixed continuously (e.g. by a static mixer) and this mixture being mixed (e.g. by a static mixer) and reacted with HDI. The second diisocyanate which differs from HDI is mixed in (if present) in a further step. Mixing in of the second diisocyanate can take place e.g. by a static mixer, tube mixer or also in the extruder. The mixture can react completely, e.g. in an extruder, and can then be granulated.

The polyol-chain lengthener mixture and the diisocyanate should preferably have a temperature difference of <20° C., preferably <10° C., particularly preferably <5° C. before mixing. The absolute raw material temperatures are preferably between 60° C. and 150° C., particularly preferably between 80° C. and 120° C.

The optional diisocyanate which differs from HDI can be reacted first with the polyol-chain lengthener mixture. HDI is then mixed in and also reacted.

The addition of additives can take place after the polymerization, by compounding, or during the polymerization. During the polymerization, for example, antioxidants and UV stabilizers can be dissolved in the polyol. However, lubricants and stabilizers can also be added during the extruder process, for example in the second part of the screw.

The whitish formation of a deposit on the surface of shaped articles of TPU which occurs during accelerated ageing tests (e.g. after storage at 60 to 95° C.) can be avoided, in particular, by having some of the hexamethylene-diisocyanate employed in the TPU according to the invention being replaced by other aliphatic diisocyanates. This formation of a deposit can also be avoided by employing chiefly 1,6-hexanediol as the chain lengthener.

The TPU according to the invention can be employed for the production of shaped articles, in particular for the production of extrudates (e.g. films) and injection-moulded components. Due to their properties, they are particularly preferred in the inside of automobiles. The TPU according to the invention can furthermore be used as sinterable powders for the production of sheet-like structures and hollow bodies.

The invention is illustrated in more detail with the aid of the following examples.

EXAMPLES

Preparation of TPUs and Injection-moulded Sheets

The TPUs were prepared continuously as follows:

The mixture of polyol B), chain lengthener C) and dibutyltin dilaurate was heated to approx. 110° C. in a tank, while stirring, and was mixed intensively together with the corresponding diisocyanate, which was heated to approx. 110° C. by means of a heat exchanger, by a static mixer from Sulzer (DN6 with 10 mixing elements and a shear rate of 500 s$^{-1}$), and the mixture was then passed to the intake of a screw (ZSK 32).

Where applicable, the optional diisocyanate which differs from HDI was fed into the 1st zone of the screw (ZSK 32). The entire mixture reacted in the extruder until the reaction was complete, and was then granulated.

The granules were dried and then in each case injection-moulded to several injection-moulded sheets. Some of the injection-moulded sheets were in each case stored in a circulating air drying cabinet at 85° C. and tested for the formation of a deposit on the surface. The formation of a deposit is particularly easy to detect visually from fingerprints on the shaped article. The specimens were evaluated qualitatively, since no measurement method is known. The other injection-moulded sheets were each subjected to the weathering described below. The yellow value and the modulus of elasticity over temperature were then measured.

Terathane 2000®: Polytetrahydrofuran diol of $\overline{M}_n$=2,000 g/mol (DuPont)

Terathane 1000®: Polytetrahydrofuran diol of $\overline{M}_n$=1,000 g/mol (DuPont)

HDI: Hexamethylene-diisocyanate

IPDI: Isophorone-diisocyanate $H_{12}$-MDI: Isomer mixture of dicyclohexylmethane-diisocyanate Abril® 10 DS: Bissstearylamide (Würtz GmbH)

Irganox® 1010: Tetrakis[methylene-(3,5-di-tert-butyl-4-hydroxyhydro-cinnamate)]methane (Ciba Geigy)

Tinuvin® 328: 2-(2'-Hydroxy-3'-5'-di-tert-amylphenyl-benzotriazole (Ciba Geigy)

Tinuvin® 622: Dimethyl succinate polymer with 4-hydroxy-2,2,6,6-tetra-methyl-1-piperidine-ethanol (Ciba Geigy)

Loxiol® G78: Stearic acid (Hoechst)

Acrawax® C: Bissstearylamide (Lonza)

1,6 HDO: 1,6-Hexanediol

Tinuvin® 213: Poly(oxy-1,2-ethanediyl),(α,(3-(3-(2H-benzotriazol-2-yl)-5-(1,1-dimethylethyl)-4-hydroxyphenyl)-1-oxopropoxyl)-ω-(3-(3-(2H-benzotriazol-2-yl)-5-(1,1-dimethylethyl)-4-hydroxyphenyl)-1-oxopropoxy; major component (Ciba Geigy)

Tinuvin® 765: Bis(1,2,2,6,6-Pentamethyl-4-piperidinyl) sebacate; main constituent (Ciba Geigy)

Irganox® 245: Ethylene-bis(oxyethylene)bis(3-tert.-butyl-4-hydroxy-5(methylhydrocinnamate) (Ciba Geigy)

Composition of the TPUs (thermoplastic polyurethanes):

| TPU | HDI mol/g* | IPDI mol/g* | HDI/IPDI mol %/mol % | DE2020 mol/g* | PE225B mol/g* | 1,4 BDO mol/g* | 1,6 HDO mol/g* | DBTL ppm |
|---|---|---|---|---|---|---|---|---|
| 1 | 5.09/855 | — | 100/— | 1.0/2000 | 0.43/967 | 3.76/339 | — | 40 |
| 2 | 4.83/813 | 0.25/56 | 95/5 | 1.0/2000 | 0.43/967 | 3.76/339 | — | 60 |
| 3 | 4.58/770 | 0.51/113 | 90/10 | 1.0/2000 | 0.43/967 | 3.76/339 | — | 100 |
| 4 | 4.07/685 | 1.02/226 | 80/20 | 1.0/2000 | 0.43/967 | 3.76/339 | — | 120 |
| 10 | 5.09/856 | — | — | 1.0/2000 | 0.43/967 | — | 3.76/445 | 40 |
| 11 | 6.05/1018 | — | — | 1.0/2000 | 0.43/967 | — | 4.75/561 | 40 |
| 12 | 7.3/1237 | — | — | 1.0/2000 | 0.43/967 | — | 6.07/719 | 40 |
| 13 | 5.44/916 | 0.61/136 | 90/10 | 1.0/2000 | 0.43/967 | — | 4.75/561 | 100 |
| 14 | 5.14/865 | 0.91/202 | 85/15 | 1.0/2000 | 0.43/967 | — | 4.75/561 | 120 |
| 15 | 5.09/856 | — | — | 1.0/2000 | 0.43/967 | 0.75/68 | 3.01/356 | 40 |
| 16 | 5.09/856 | — | — | 1.0/2000 | 0.43/967 | — | 3.01/356 | 40 |

*The amount of the reactants are shown in mols and in grams (mol/g)

DBTL: Dibutyltin dilaurate

DE2020: Polycarbonate diol based on 1,6-hexanediol having a number average molecular weight $\overline{M}_n$=2000 g/mol PE 225B: Polybutanediol adipate having a number average molecular weight $\overline{M}_n$=2,250 g/mol 1,4BDO: 1,4-Butanediol PE 100B: Polybutanediol adipate of $\overline{M}_n$=1,000 g/mol TPU 1 to 4 and 10 to 16 comprise 0.3 wt. % Abril® 10DS, 0.3 wt. % Irganox® 1010, 0.4 wt. % Tinuvin® 328 and 0.4 wt. % Tinuvin® 622, in each case based on the TPU. The content of DBTL is based on the polyol mixture.

TPU 16 comprises 0.75 mol (78 g) neopentylglycol (2,2-dimethyl-1,3-propanediol).

TPU 15: HDO:BDO=80:20 (ratio of the molar percentages)

TPU 16: HDO:neopentylglycol=80:20 (ratio of the molar percentages)

Composition of the TPUs

| TPU | Diisocyanate mol/g* | | Polyol 1 mol/g* | | Polyol 2 mol/g* | | 1,4 BDO mol/g* | DBTL ppm |
|---|---|---|---|---|---|---|---|---|
| 5 | 2.8/473 | HDI | 0.5/1000 | Terathane 2000 | 0.5/500 | Terathane 1000 | 1.84/166 | 60 |
| 6 | 3.38/568 | HDI | 1.0/2250 | PE225B | — | — | 2.41/217 | 60 |
| 7 | 5.09/855 | HDI | 1.0/2000 | DE2020 | 0.43/967 | PE 225B | 3.76/339 | 60 |
| Comparison 1 | 3.76/987 | $H_{12}$-MDI | 1.0/1000 | PE100B | — | — | 2.76/249 | 300 |
| Comparison 2 | 4.16/1092 | $H_{12}$-MDI | 1.0/1000 | Terathane 1000 | — | — | 3.16/285 | 300 |
| 8 | 3.37/567 | HDI | 1.0/2000 | DE 2020 | 0.43/967 | PE 225B | 1.94/175 | 60 |
| 9 | 3.04/512 | HDI | 1.0/2000 | DE 2020 | 0.43/967 | PE 225B | 1.61/145 | 60 |
| 17 | 2.8/473 | HDI | 0.5/1000 | Terathane 2000 | 0.5/1000 | Terathane 1000 | — | 60 |

TPU 17 contains 1,6 HDO(1.84 mol; 217 g) as a chain lengthener.
The amounts of the reactants are shown in mols and in grams (mol/g).

TPU 5 to 9 and 17 and Comparison 1 and 2 furthermore comprise the following additives:

| TPU | wt. %, based on TPU (A) + B) + C)) |
|---|---|
| 5 | 0.3% Abril 10 DS, 0.3% Irganox 1010, 0.4% Tinuvin 328, 0.4% Tinuvin 622 |
| 6 | analogously to TPU 5 |
| 7 | 0.55% Loxiol G78, 0.17% Irganox 245, 0.35% Tinuvin 328, 0.35% Tinuvin 622 |
| Comparison 1 | 0.3% Acrawax C, 0.4% Irganox 1010, 0.4% Tinuvin 213, 0.4% Tinuvin 765 |
| Comparison 2 | 0.5% Acrawax C, 0.5% Irganox 1010, 0.4% Tinuvin 213, 0.4% Tinuvin 622 |
| 8 | analogously to TPU 7 |
| 9 | analogously to TPU 7 |
| 17 | analogously to TPU 5 |

Results:

Formation of a deposit on storage at 85° C. after

| TPU | 0 days | 7 days | 14 days | 21 days |
|---|---|---|---|---|
| 1 | none | too much | too much | too much |
| 2 | none | very little | little | little |
| 3 | none | very little | very little | little |
| 4 | none | very little | very little | little |
| 10 | none | very little | very little | very little |
| 11 | none | very little | very little | very little |
| 12 | none | very little | very little | very little |
| 13 | none | very little | very little | very little |
| 14 | none | very little | very little | very little |
| 15 | none | very little | very little | very little |
| 16 | none | very little | very little | very little |
| 17 | none | very little | very little | very little |

Results:

| | before weathering | | | after weathering | | |
|---|---|---|---|---|---|---|
| TPU | $T_{sof}$ (at E' = 3 MPa) in ° C. | Shore A hardness | Yellow value | $T_{sof}$ (at E' = 3 MPa) in ° C. | Yellow value | Shore A hardness |
| 1 | 153 | 91 | 12 | 153 | 12 | 91 |
| 2 | 148 | 89 | 11 | 148 | 13 | 89 |
| 3 | 141 | 87 | 11 | 141 | 12 | 87 |
| 4 | 134 | 86 | 12 | 134 | 13 | 86 |
| 5 | 143 | 88 | 12 | 144 | 13 | 88 |
| 6 | 146 | 89 | 12 | 145 | 12 | 89 |
| 7 | 149 | 90 | 11 | 148 | 12 | 90 |
| 8 | 121 | 84 | 11 | 120 | 12 | 84 |
| 9 | 117 | 81 | 12 | 118 | 12 | 81 |
| 10 | 144 | 91 | 11 | 143 | 12 | 91 |
| 11 | 149 | 93 | 12 | 150 | 13 | 93 |
| 12 | 155 | 94 | 11 | 154 | 12 | 94 |
| Comparison 1 | 120 | 92 | 10 | 119 | 10 | 92 |
| Comparison 2 | 120 | 94 | 10 | 121 | 10 | 94 |
| 13 | 141 | 89 | 10 | 140 | 11 | 89 |
| 14 | 135 | 88 | 11 | 136 | 10 | 88 |
| 15 | 132 | 88 | 12 | 133 | 11 | 88 |
| 16 | 134 | 89 | 11 | 133 | 12 | 89 |
| 17 | 138 | 86 | 13 | 137 | 13 | 86 |

Test Conditions

Rectangular injection-moulded sheets (125 mm×50 mm×1 mm) were produced from the TPU.

Dynamic-mechanical Analysis (DMS)

Rectangles (30 mm×10 mm×1 mm) were stamped out of the injection-moulded sheets. These test sheets were subjected periodically to very small deformations under a constant pre-load—optionally dependent on the storage modulus—and the force acting on the clamp was measured as a function of the temperature and stimulation frequency.

The pre-load additionally applied serves to keep the specimen still adequately tensioned at the point in time of negative deformation amplitudes.

The softening temperature $T_{sof}$ was determined as the characteristic temperature of the heat resistance at E'=3 MPa.

The DMS measurements were carried out with the Seiko DMS model 210 from Seiko with 1 Hz in the temperature range from −150° C. to 200° C. with a heating rate of 2° C./min.

Weathering of the Specimens

The test specimens were weathered in a weathering apparatus CI 4000 WOM for 504 hours. The test cycle was 102 min light and 18 min light and rain at a black standard temperature of 65° C. The irradiation intensity was 0.35 W/m² at 340 nm and 50% rel. atmospheric humidity. These conditions substantially corresponded to ISO 4892. Both the E' modulus measurements (DMS) and the yellow value determination were carried out on the weathered test specimens.

Determination of the Yellow Value

The yellow value was determined on the test specimens with the Minolta Chroma Meter CR-100. The determination of the yellow value substantially follows DIN 6167.

The apparatus is calibrated before each measurement series. After the measurement. flash has been triggered, the display must show the values noted on the white calibration plate on the rear.

The reference yellow value of the calibration plate is 3.75.

The yellow value (Y) is calculated as follows:

$$Y = \frac{(2.45^{*}x - 1.149)}{y} 1.149^{*}100$$

The yellow value (Y) can be calculated with the above formula.

To measure the yellow value, the test specimen is placed on the white ceramic reference plate such that the central regions lie on top of one another. The measurement flash is then triggered.

The x and y values are measured and the yellow value (Y) is calculated according to the above formula.

What is claimed is:

1. A molding composition comprising:

an aliphatic, thermoplastic polyurethane which is the product of reacting solely
      an aliphatic diisocyanate containing 60 to 100 mol % hexamethylene-diisocyanate and 0 to 40 mol % of at least one other aliphatic diisocyanate,
      at least one polyol having a number average molecular weight of 600 to 5,000 g/mol selected from the group consisting of polyester polyols, polyether polyols and polycarbonate diols, and
      a chain lengthening reactant having an average molecular weight of 60 to 500 g/mol,
      wherein the equivalent ratio of the aliphatic diisocyanate to the at least one polyol is 1.5:1.0 to 10.0:1.0, the NCO index is 95 to 105, the polyurethane exhibits a Shore A hardness value of 75 to 92 and a softening temperature greater than 100° C., said softening temperature being determined by means of dynamic-mechanical analysis in tensile mode at E'=3 Mpa, said hardness value referring to measurements both pre- and post-weathering and wherein polyurethane exhibiting a Shore A hardness of value 85 to 94 and a softening temperature lower than 130° C. is excluded; and
   a UV stabilizer which is present in an amount of 0.4 to 0.9 percent relative to the total weight of the polyurethane,
   wherein said composition has a post-weathering yellowness index determined after 504 hours in accordance with ISO 4892 of lower than 20.

2. The molding composition of claim 1, wherein said post-weathering yellowness index is lower than 15.

3. The molding composition of claim 1, wherein said at least one polyol is a polyester polyol.

4. The molding composition of claim 1, wherein said at least one polyol is a polyether polyol.

5. The molding composition of claim 1, wherein said at least one polyol is a polycarbonate diol.

6. The molding composition of claim 1, wherein the chain lengthening reactant comprises at least 80 percent relative to the weight of the chain lengthening reactant of 1,6-hexanediol.

* * * * *